United States Patent
Yin (10) Patent No.: US 10,253,893 B2
(45) Date of Patent: Apr. 9, 2019

(54) INFLATION VALVE SEAT WITH ADJUSTABLE FLOW

(71) Applicant: TangTring Seating Technology Inc., Huizhou, Guangdong (CN)

(72) Inventor: Zu-Jun Yin, Guangdong (CN)

(73) Assignee: TANGTRING SEATING TECHNOLOGY INC., Huizhou Guangdong (CN)

( * ) Notice: Subject to any disclaimer, the term of this patent is extended or adjusted under 35 U.S.C. 154(b) by 0 days.

(21) Appl. No.: 15/684,289

(22) Filed: Aug. 23, 2017

(65) Prior Publication Data
US 2019/0063624 A1    Feb. 28, 2019

(51) Int. Cl.
| F16K 11/22 | (2006.01) |
| F16K 27/00 | (2006.01) |
| F16K 15/20 | (2006.01) |

(52) U.S. Cl.
CPC ............ *F16K 11/22* (2013.01); *F16K 15/207* (2013.01); *F16K 27/003* (2013.01); *Y10T 137/86131* (2015.04); *Y10T 137/86139* (2015.04); *Y10T 137/87169* (2015.04)

(58) Field of Classification Search
CPC ...... F16K 11/22; F16K 15/207; F16K 27/003; Y10T 137/86131; Y10T 137/86139; Y10T 137/87169; B60N 2/665; A47C 27/08–27/084; A47C 4/54; B60C 29/00
USPC ................................. 137/596, 565.29, 565.3
See application file for complete search history.

(56) References Cited

U.S. PATENT DOCUMENTS

| 4,655,505 A | * | 4/1987 | Kashiwamura | ........ A47C 7/467 297/284.6 |
| 6,014,784 A | * | 1/2000 | Taylor | ................ A61G 7/05776 297/284.6 |
| 7,704,217 B2 | * | 4/2010 | Morrison | ................. A47C 4/54 601/148 |
| 8,616,654 B2 | * | 12/2013 | Zenk | ...................... B60N 2/914 297/452.41 |
| 9,661,928 B2 | * | 5/2017 | Patrick | ............... B64D 11/0647 |
| 2010/0031449 A1 | * | 2/2010 | Cheng | .................. A61H 9/0078 5/713 |
| 2012/0086249 A1 | * | 4/2012 | Hotary | ................... B60N 2/809 297/284.3 |

(Continued)

FOREIGN PATENT DOCUMENTS

| CN | 105443807 A | 3/2016 |
| TW | M521954 U | 5/2016 |

*Primary Examiner* — Craig J Price
(74) *Attorney, Agent, or Firm* — Muncy, Geissler, Olds & Lowe, P.C.

(57) ABSTRACT

An inflation valve seat with adjustable flow includes two valve seats and an intercommunicating valve. Each valve seat is connected to an air pump, and includes an inflation valve assembly, a deflation valve, and an air channel in communication with the air pump, the inflation valve assembly and the deflation valve. The intercommunicating valve is connected between the two valve seats to provide a disconnected state and a communicated state between the two valve seats. When the two air channels form the disconnected state, the two valve seats have a low-flow inflating state and a low-flow deflating state. When the two air channels form the communicated state, the two valve seats have a high-flow inflating state and a high-flow deflating state.

4 Claims, 7 Drawing Sheets

(56) References Cited

U.S. PATENT DOCUMENTS

| | | | |
|---|---|---|---|
| 2016/0000640 A1* | 1/2016 | Lai | A61H 9/0078 601/149 |
| 2016/0106620 A1* | 4/2016 | Uno | B60N 2/448 601/149 |
| 2016/0175184 A1* | 6/2016 | Arkans | A61H 9/0092 601/149 |
| 2016/0229320 A1* | 8/2016 | Lem | B60N 2/448 |
| 2017/0159651 A1* | 6/2017 | Shih | F04B 49/08 |

* cited by examiner

INFLATION VALVE SEAT WITH ADJUSTABLE FLOW

FIELD OF THE INVENTION

The present invention relates to an inflation valve seat, and particularly to an inflation valve seat capable of adjusting inflation and deflation air flow.

BACKGROUND OF THE INVENTION

An air valve is primarily used for inflating and deflating at least one air bag to provide an air cushion with appropriate softness, e.g., an inflatable mattress, an inflatable sofa and an inflatable cushion.

With respect to a common air valve, an inflation valve is generally connected to an air pump and an air bag, so as to achieve inflation of the air bag through introducing a gas by the air pump and via the inflation valve, and to prevent the gas having entered the air bag from leaking by the inflation valve. To deflate the air bag, a deflation valve is additionally connected on the air bag or on the inflation valve, so as to allow the gas in the air bag to pass through the deflation valve to achieve deflation.

For example, the China Patent No. CN105443807, a prior application of the Applicant, discloses a composite distributive air valve assembly including a control air valve and at least two inflation valves capable of respectively inflating or deflating different air bag assemblies. The control air valve includes a normally closed first distribution channel in communication with one of the inflation valves, and a normally open second distribution channel in communication with the other inflation valve. Each of the two inflation valves includes a check valve, a normally open inflation tube and a normally closed deflation opening. As such, once an air pump pumps for gas, one of the air bag assemblies can be directly inflated, or the other air bag assembly can be inflated by switching the control air valve. Further, when the air pump stops pumping, the pressure of gas in the air bag can be maintained by the check valve. When any of the deflation valves operates, the corresponding air bag can be deflated, thus the number of valves and the control program can be significantly simplified.

For another example, the Taiwan Patent Publication No. M521954 discloses a fast inflation device for an air mattress. This disclosure includes a first gas source and a second gas source. The first gas source is connected to a gas conduit pipe, and the second gas source is connected to a fast inflation pipe. The gas conduit pipe is connected to a first inflation portion of an air mattress, and includes a connecting tube connected to a gas intake pipe. The fast inflation pipe is connected to the gas conduit pipe, and the gas intake pipe is connected to a second inflation portion of the air mattress. Thus, using the assembly relationship of the first gas source, the second gas source, the gas conduit pipe, the fast inflation pipe and the gas intake pipe, after the first gas source and the second gas source provide a gas, the first inflation portion and the second inflation portion can be quickly transformed from an initial state to an inflated state. When the first inflation portion is in the inflated state, a part of the first gas source is alternately in communication with the gas conduit pipe, allowing a part of the first inflation portion to alternate between a non-inflation state and the inflated state.

However, in the above air valves, an air pump is primarily used to coordinate with at least one air valve to inflate and deflate at least one air bag, and the air flow for inflation and deflation cannot be changed according to application requirements, resulting in lowered inflation and deflation efficiencies.

SUMMARY OF THE INVENTION

In view of the above, it is an object of the present invention to provide an inflation valve seat capable of adjusting inflation and deflation air flow.

According to the above object, the present invention provides an inflation valve seat with adjustable air flow. The inflation valve seat includes two valve seats and an intercommunicating valve. Each of the valve seats is connected to an air pump, and includes an inflation valve assembly, a deflation valve, and an air channel in communication with the air pump, the inflation valve assembly and the deflation valve. As such, when the deflation valve is in a closed state and the inflation valve assembly is in an open state, each of the valve seats has an inflating state, in which a gas is introduced by the air pump, passes through the air channel and enters the inflation valve assembly; when the deflation valve is in an open state and the inflation valve assembly is in the open state, each of the valve seats has a deflated state, in which the gas exits the inflation valve assembly, passes through the air channel and discharges via the deflation valve. The intercommunicating valve is connected between the two air channels of the two valve seats to provide a disconnected state and a communicated state between the two air channels. When the disconnected state is formed between the two air channels, each of the valve seats has a low-flow inflating state of the inflating state formed by inflating the inflation valve assembly by the gas, and a low-flow deflating state of the deflating state formed when the gas discharges via the deflation valve. When the communicated state is formed between the two air channels, each of the valve seats has a high-flow inflating state of the inflating state formed by simultaneously inflating the inflation valve assembly of one of the valve seats by the two air pumps, and a high-flow deflating state of the deflating state formed by simultaneously deflating one of the inflation valve assemblies by the two deflation valves.

In one embodiment, each of the inflation valve assemblies further includes an inflation valve and an air bag. The inflation valve is in communication with the air channel, and the air bag is connected to the inflation valve, so as to cause the gas to pass through the air channel and the inflation valve to form the inflating state of the air bag.

In one embodiment, each of the inflation valve assemblies further includes two inflation valves and two air bags. Each of the inflation valves are in communication with the air channels, respectively, and the air bags are connected to the inflation valves, respectively, so as to cause the gas to pass through the air channels and the two inflation valves to form the inflating state of the two air bags, respectively.

In one embodiment, the intercommunicating valve is further disposed in one of the valve seats, and is connected to the air channel in the valve seat.

With the above technical solution, the present invention substantially achieves following effects as opposed to the prior art.

By opening and closing the intercommunicating valve of the present invention, the disconnected state and the communicated state between the first air channel and the second air channel are controlled to further selectively inflate or deflate the air bags by a smaller or larger air flow, thereby

DETAILED DESCRIPTION OF THE PREFERRED EMBODIMENTS

Details and technical contents of the present invention are given with the accompanying drawings below.

Figure 1:
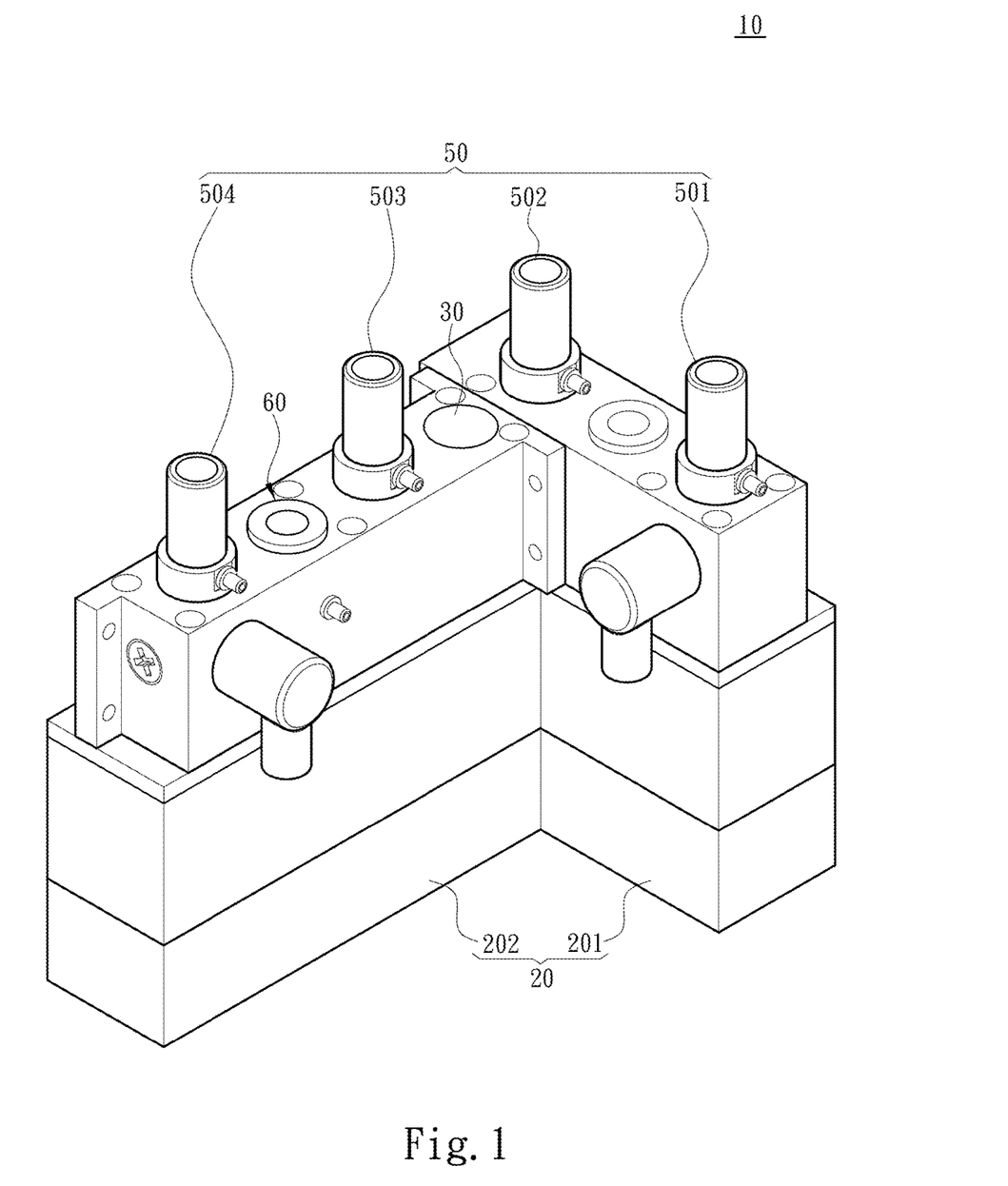
FIG. 1 is a perspective schematic diagram of the present invention.
Figure 2:
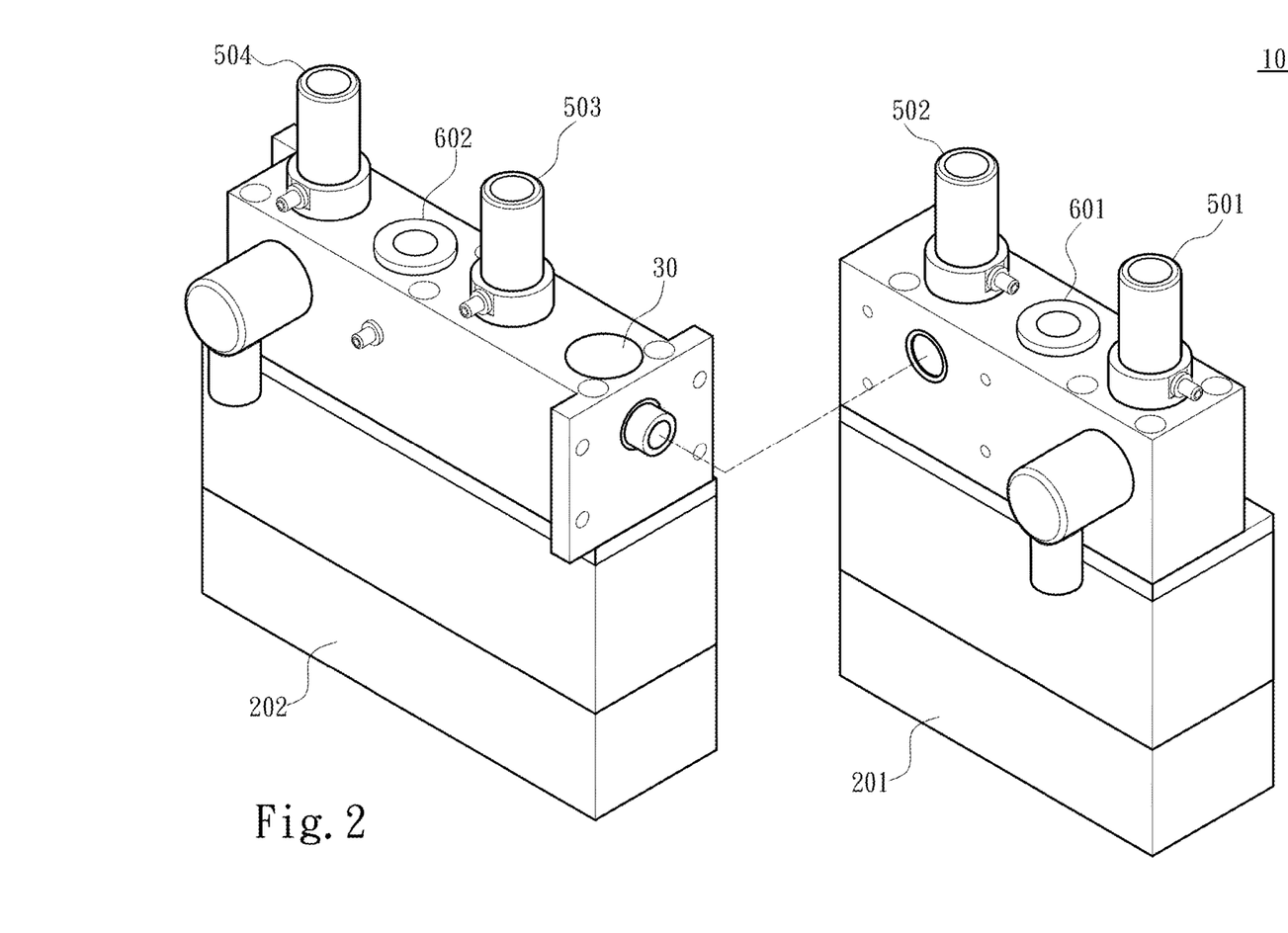
FIG. 2 is an exploded schematic diagram of the present invention.
Figure 3:
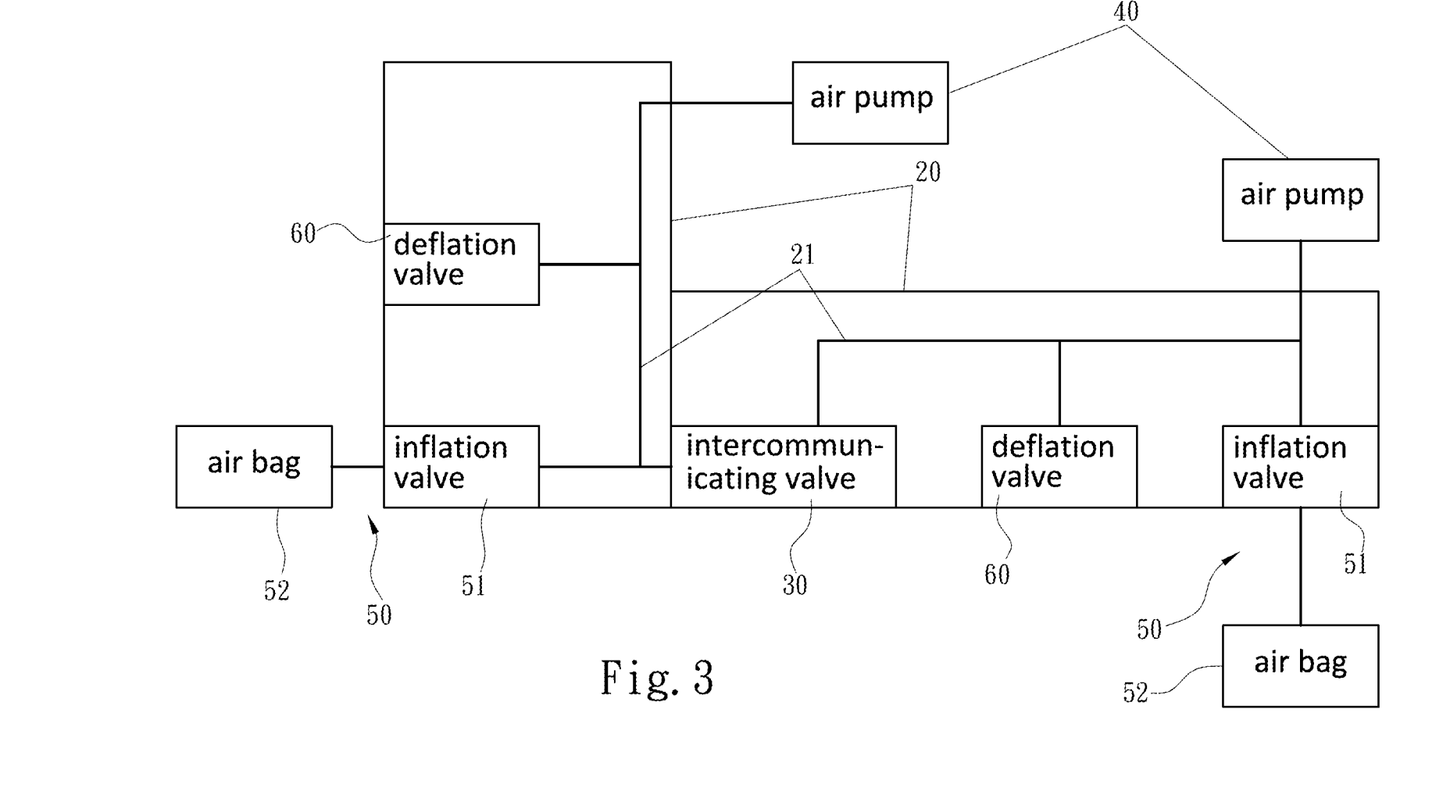
FIG. 3 is a system block diagram according to a first embodiment of the present invention.

Referring to FIG. 1 to FIG. 3, the present invention provides an inflation valve seat 10 with adjustable flow. The inflation valve seat 10 includes two valve seats 20 and an intercommunicating valve 30. Each of the valve seats 20 is connected to an air pump 40, and includes at least one inflation valve assembly 50, a deflation valve 60, and an air channel 21 in communication with the air pump 40, the inflation valve assembly 50 and the deflation valve 60. Each of the inflation valve assemblies 50 further includes at least one inflation valve 51 and at least one air bag 52. The inflation valve 51 is in communication with the air channel 21, and the air bag 52 is in connected to the inflation valve 51, such that each valve seat 20 has an inflating state and a deflating state. In the inflating state, a gas is introduced by the air pump 40, and passes through the air channel 21 and the inflation valve 51 to inflate the air bag 52. In the deflating state, the gas exist the air bag 52, passes through the inflation valve 51 and the air channel 21, and discharges via the deflation valve 60.

As shown in FIGS. 1, 2, 4 and 5, in this embodiment, the two valve seats 20 include a first valve seat 201 and a second valve seat 202. The first valve seat 201 is connected to a first air pump 401, and includes the two inflation valve assemblies 50, a first deflation valve 601, and a first air channel 211 connected to the first air pump 401, the two inflation valve assemblies 50 and the first deflation valve 601. The two inflation valve assemblies 50 include a first inflation valve assembly 501 and a second inflation valve assembly 502. The first inflation valve assembly 501 includes a first inflation valve 511 and a first air bag 521, and the second inflation valve assembly 502 includes a second inflation valve 512 and a second air bag 522. The first inflation valve 511 and the second inflation valve 512 are in communication with the first air channel 211; the first air bag 521 is connected to the first inflation valve 511, and the second air bag 522 is connected to the second inflation valve 512.

The second valve seat 202 is connected to a second air pump 402, and includes the two inflation valve assemblies 50, a second deflation valve 602, and a second air channel 212 connected to the second air pump 402, the two inflation valve assemblies 50 and the second deflation valve 602. The two inflation valve assemblies 50 include a third inflation valve assembly 503 and a fourth inflation valve assembly 504. The third inflation valve assembly 503 includes a third inflation valve 513 and a third air bag 523. The fourth inflation valve assembly 504 includes a fourth inflation valve 514 and a fourth air bag 524. The third inflation valve 513 and the fourth inflation valve 514 are in communication with the second air channel 212; the third air bag 523 is connected to the third inflation valve 513, and the fourth air bag 524 is connected to the fourth inflation valve 514.

The intercommunicating valve 30 connects the first valve seat 201 and the second valve seat 202, and is disposed between the first air channel 211 and the second air channel 212, so as to provide a disconnected state and a communicated state between the first air channel 211 and the second air channel 212. In this embodiment, the intercommunicating valve 30 is installed in the second valve seat 202 as an implementation example. In practice, the intercommunicating valve 30 may be an independent valve and is connected between the first valve seat 201 and the second valve seat 202, or may be directly installed in the first valve seat 201.

Figure 4:
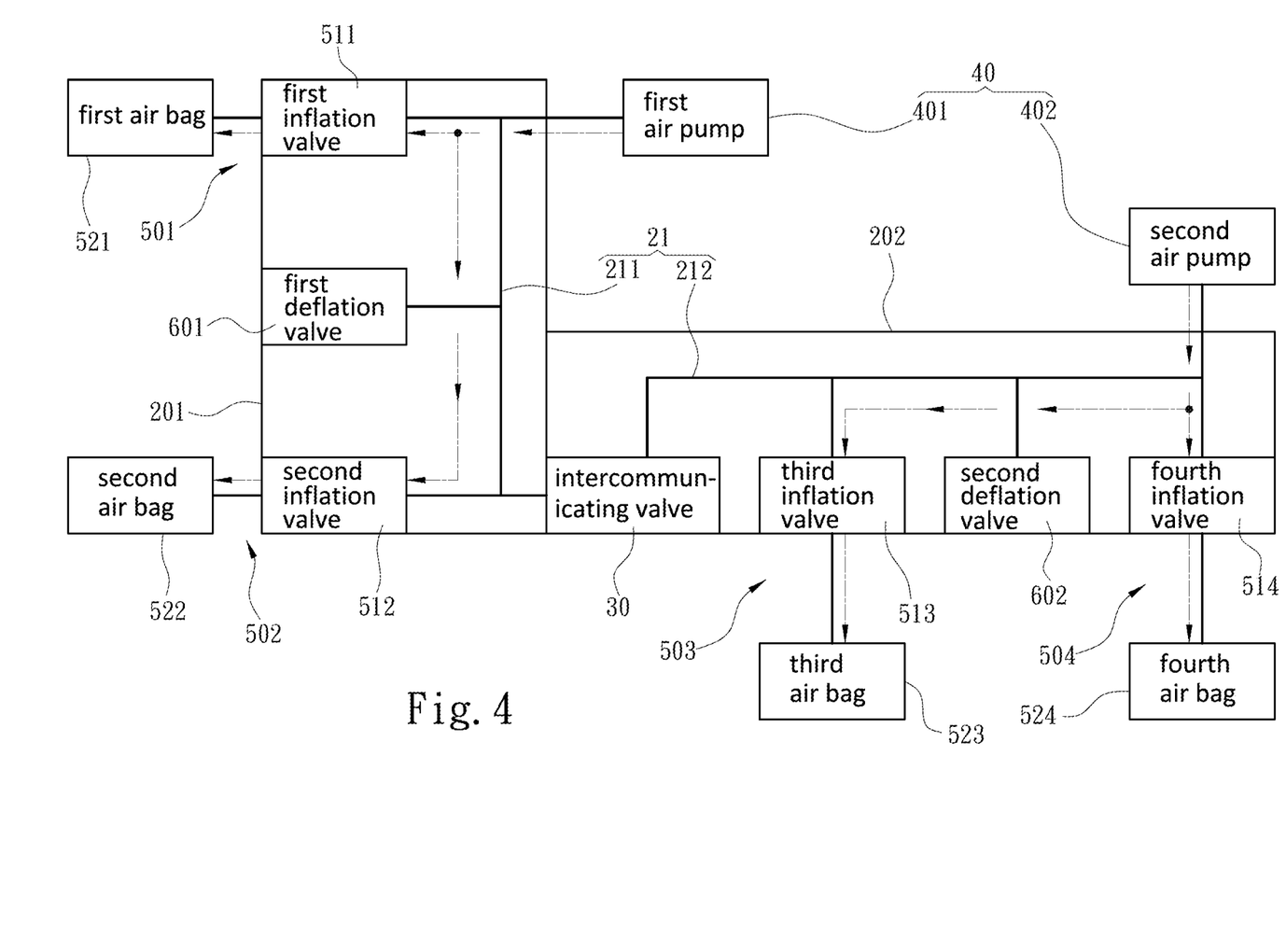
FIG. 4 is a system block diagram with low-flow inflation performed according to a second embodiment of the present invention.
Figure 5:
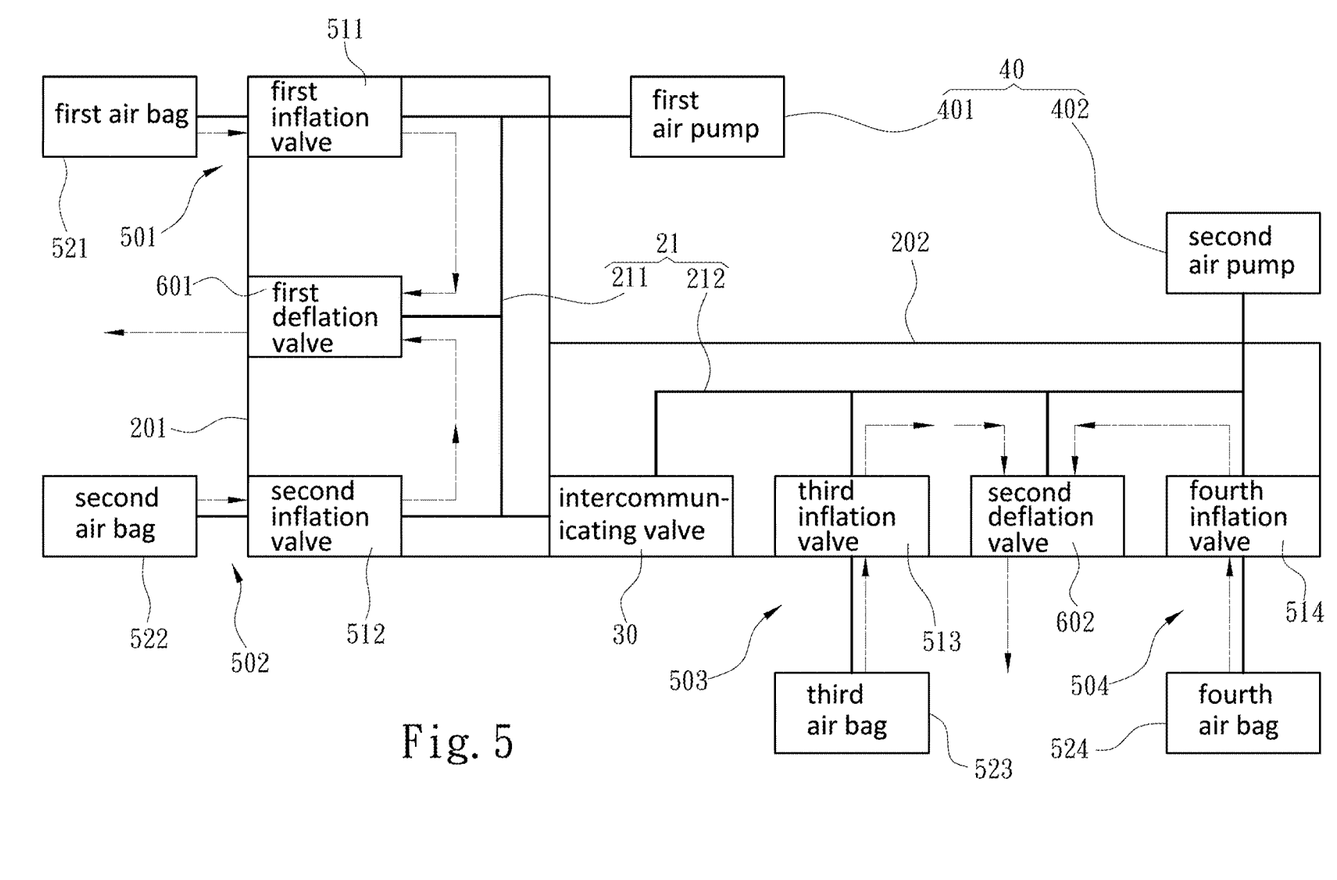
FIG. 5 is a system block diagram with low-flow deflation performed according to the second embodiment of the present invention.

As shown in FIG. 4 and FIG. 5, when the disconnected state is formed between the first air channel 211 and the second air channel 212 by using the intercommunicating valve 30 between the first valve seat 201 and the second valve seat 202, because the first air channel 211 and the second air channel 212 are not mutually communicated, both of the first deflation valve 601 and the second deflation valve 602 are both in a closed state at this point. Thus, a gas is pumped into the first air bag 521 and the second air bag 522 by the first air pump 401, and the gas is caused to pass through the first air channel 211 as well as the first inflation valve 511 and the second inflation valve 512 to form the inflating state having a smaller flow with respect to the first air bag 521 and the second air bag 522, respectively. To deflate the first air bag 521 and the second air bag 522, the gas exits the first air bag 521 and the second air bag 522through the first inflation valve 511 and the second inflation valve 512 to enter the first air channel 211, and flows from the first air channel 211 through the first deflation valve 601 and is discharged to form the deflating state having a smaller flow.

Further, the gas is pumped into the third air bag 523 and the fourth air bag 524 by the second air pump 402, and the gas is caused to pass through the second air channel 212 as well as the third inflation valve 513 and the fourth inflation valve 514 and enter the third air bag 523 and the fourth air bag 524, respectively, to form the inflating state having a smaller flow with respect to the third air bag 523 and the fourth air bag 524. Conversely, to deflate the third air bag 523 and the fourth air bag 524, the gas exists from the third air bag 523 and the fourth air bag 524, passes through the third inflation valve 513 and the fourth inflation valve 514, enters the second air channel 212, and is discharged via the second deflation valve 602 to form the inflating state having a smaller flow.

Figure 6:
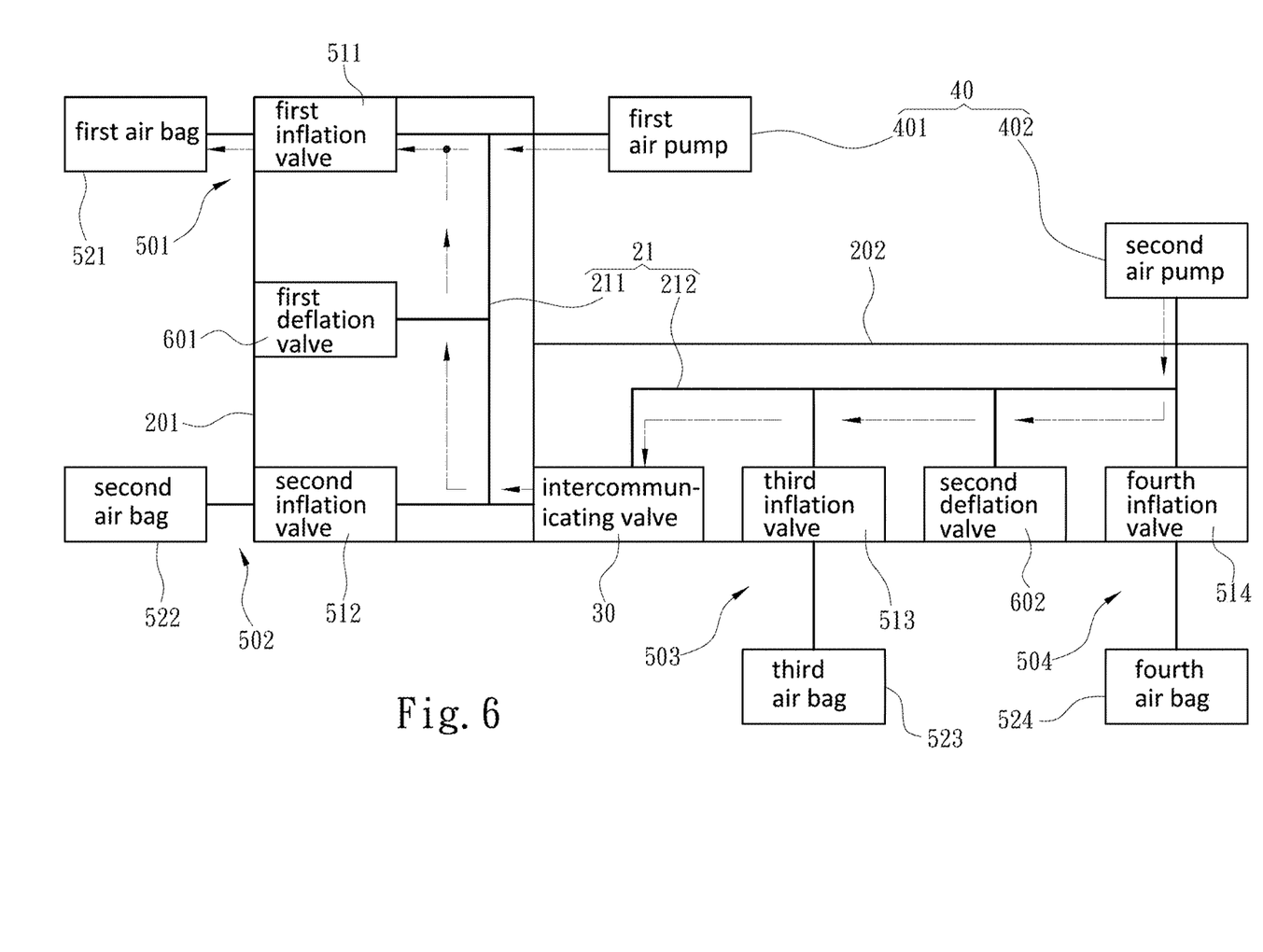
FIG. 6 is a system block diagram with high-flow inflation performed according to the second embodiment of the present invention.
Figure 7:
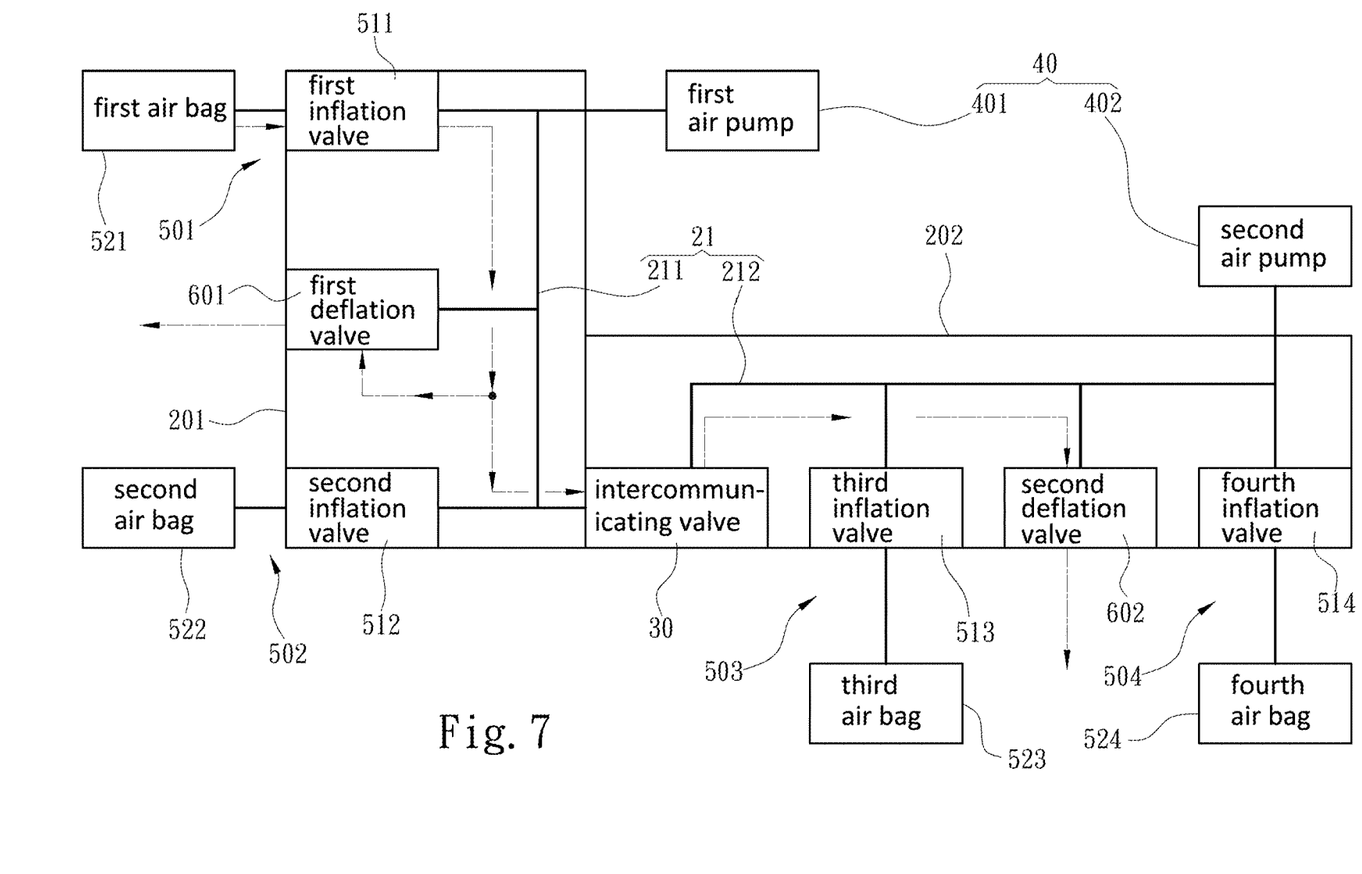
FIG. 7 is a system block diagram with high-flow deflation performed according to the second embodiment of the present invention.

As shown in FIG. 6 and FIG. 7, when the first valve seat 201 and the second valve seat 202 use the intercommunicating valve 30 to form the communicated state between the first air channel 211 and the second air channel 212, the first deflation valve 601 and the second deflation valve 602 at this point are in a closed state, and the first air channel 211 and the second air channel 212 are in the communicated state. Thus, the first air bag 521 and the second air bag 522 may simultaneously introduce the gas by the first air pump 401 and the second air pump 402, respectively. At this point, the third inflation valve 513 and the fourth inflation valve 514 are in the closed state, and the gas is caused to pass through the first air channel 211 and the second air channel 212 as well as the first inflation valve 511 and the second inflation valve 512, and form the inflating state having a higher flow with respect to the first air bag 521 and the second air bag 522, respectively. Therefore, the inflation speed of the first air bag 521 and the second air bag 522 can be increased.

Further, to inflate the third air bag 523 and the fourth air bag 524, the first inflation valve 511 and the second inflation valve 512 are in the closed state at this point. The third air bag 523 and the fourth air bag 524 can simultaneously introduce the gas by the first air pump 401 and the second air pump 402, and the gas is caused to pass through the first air channel 211 and the second air channel 212 as well as the third inflation valve 513 and the fourth inflation valve 514 to simultaneously form the inflating state having a higher flow with respect to the third air bag 523 and the fourth air bag 524, respectively.

To deflate the first air bag 521 and the second air bag 522, the first deflation valve 601 and the second deflation valve 602 are both in the open state at this point. The gas flows from the first air bag 521 and the second air bag 522, passes through the first inflation valve 511 and the second inflation valve 512, enters the first air channel 211 and the second air channel 212, and discharges simultaneously via the first deflation valve 601 and the second deflation valve 602 to form the deflating state having a higher flow.

To deflate the third air bag 523 and the fourth air bag 524, the gas flows from the third air bag 523 and the fourth air bag 524, passes through the third inflation valve 513 and the fourth inflation valve 514, enters the first air channel 211 and the second air channel 212, and discharges via the first deflation valve 601 and the second deflation valve 602 to form the deflating state having a higher flow.

As described above, the inflation valve seat 10 of the present invention, primarily through opening and closing the intercommunicating valve 30, controls the disconnected state and the communicated state between the first air channel 211 and the second air channel 212, so as to selectively achieve the inflating and deflating state having a smaller or larger flow to further adjust the flow according to requirements of the air bags 52, thereby enhancing inflation and deflation efficiencies as well as reducing inflation and deflation time.

What is claimed is:

1. An inflation valve seat with adjustable flow, characterized in comprising:

two valve seats, each of the two valve seats connected to a separate air pump, each of said valve seats comprising an inflation valve assembly, a deflation valve, and an air channel in communication with one of the separate air pumps, the inflation valve assembly and the deflation valve, such that each of the valve seat an inflating state and a deflating state, in the inflating state, when the deflation valve is in a closed state and the inflation valve assembly is in an open state, a gas is introduced by one of the separate air pumps, passes through the air channel and enters the inflation valve assembly, and in the deflating state, when the deflation valve is in the open state and the inflation valve assembly is in the open state, the gas exits the inflation valve assembly, passes through the air channel, and discharges via the deflation valve; and an intercommunicating valve, connected between the two air channels of the two valve seats, providing a disconnected state and a communicated state between the two air channels, when the disconnected state is formed between the two air channels, each of the valve seats has a low-flow inflating state of the inflating state formed by inflating the inflation valve assembly by the gas, and a low-flow deflating state of the deflating state formed when the gas discharges via the deflation valve, and when the communicated state is formed between the two air channels, each of the valve seats has a high-flow inflating state of the inflating state formed by simultaneously inflating the inflation valve assembly of one of the valve seats by the two air pumps, and a high-flow deflating state of the deflating state formed by simultaneously deflating the inflation valve assembly of one of the valve seats by the two deflation valves.

2. The inflation valve seat with adjustable flow of claim 1, characterized in that, each of the inflation valve assemblies further comprises an inflation valve and an air bag, the inflation valve is in communication with the air channel, and the air bag is connected to the inflation valve, so as to cause the gas to pass through the air channel and the inflation valve to form the inflating state with respect to the air bag.

3. The inflation valve seat with adjustable flow of claim 1, characterized in that, each of the inflation valve assemblies further comprises two inflation valves and two air bags, each of the inflation valves is in communication with the air channels, and each of the air bags is connected to one of the inflation valves, so as to cause the gas to form the inflating state with respect to the two air bags through the two inflation valves, respectively.

4. The inflation valve seat with adjustable flow of claim 1, characterized in that, the intercommunicating valve is further disposed in one of the valve seats and is connected to the air channel in the valve seat.

* * * * *